May 6, 1924.

W. SLAVICK

SCRAPER

Filed Oct. 4, 1923

1,493,397

William Slavick
INVENTOR
BY Victor J. Evans
ATTORNEY

WITNESS:

Patented May 6, 1924.

1,493,397

UNITED STATES PATENT OFFICE.

WILLIAM SLAVICK, OF JUDSON, NORTH DAKOTA.

SCRAPER.

Application filed October 4, 1923. Serial No. 666,645.

*To all whom it may concern:*

Be it known that I, WILLIAM SLAVICK, a citizen of the United States, residing at Judson, in the county of Morton and State of North Dakota, have invented new and useful Improvements in Scrapers, of which the following is a specification.

The object of the present invention resides in the provision of a wheel scraper primarily intended for use on the wheels of drills, although its general application is contemplated by the claim, the invention residing in the construction, combination and arrangement of parts as claimed, and wherein the scraping blade is yieldably held in contact with the periphery of the wheel.

In the drawing forming part of this application, like numerals of reference indicate similar parts in the several views, and wherein.

Figure 1:
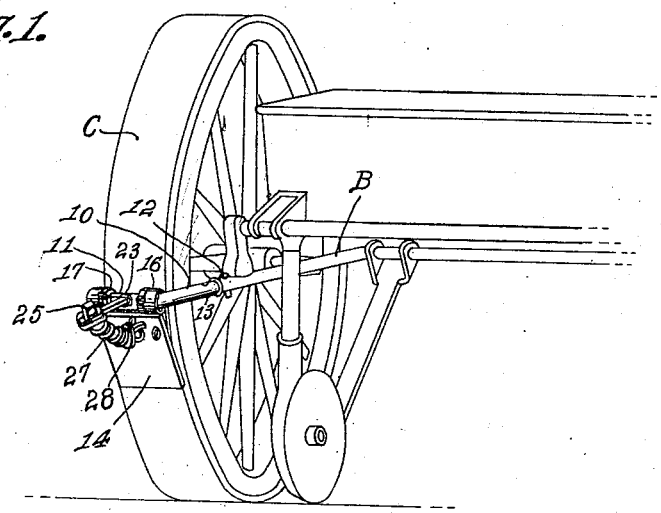
Figure 1 is a fragmentary view of a drill showing the application of the invention.
Figure 2:
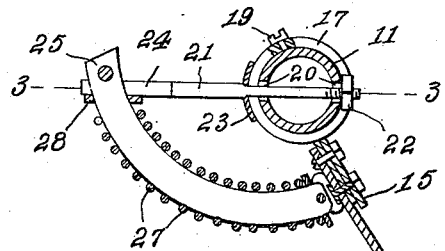
Figure 2 is a fragmentary view partly in section of the scraper attachment removed from the drill.
Figure 3:
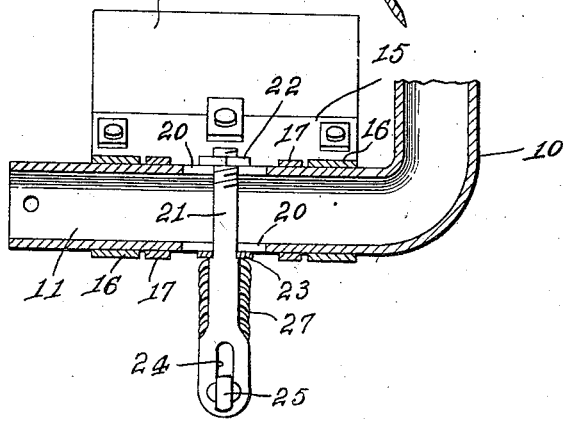
Figure 3 is a sectional view taken on the line 3—3 of Figure 2.

Referring to the drawing in detail, particularly Figure 1, I have shown a fragmentary view of a drill, wherein the frame B is generally constructed of tubing.

The scraper attachment forming the subject matter of the present invention includes a substantially L-shaped shank the long branch of which is indicated at 10 and the short branch represented at 11. This shank is of tubular formation to be received by the adjacent end of the frame B as shown in Figure 1, the parts being held associated by means of a bolt 12 passed through openings in the frame, and through anyone of the openings 13 with which the shank is provided. Consequently, the scraping blade 14 which is mounted on the short branch 11 of the shank can be adjusted toward and away from the periphery of the wheel C of the drill, by simply sliding the long branch 10 of the shank a greater or less distance within the frame B. The scraping blade 14 is secured to a plate 15 which is formed with spaced bearings 16, the latter being mounted upon the branch 11 of the shank to permit pivotal movement of the blade as well as sliding movement along that portion of the shank upon which it is mounted. The blade is held against such sliding movement by means of collars 17 which can be properly positioned on the branch 11 of the shank and held in this position by means of set screws 19. The branch 11 of the shank is formed with longitudinal slots 20 through which is passed an arm 21 the latter being threaded at one end to accommodate a nut 22 by means of which and a washer 23 the arm is held fixed relative to the shank. The outer end of this arm is longitudinally slotted as at 24 to receive a curved rod 25 carried by the scraping blade which projects rearwardly therefrom. Surrounding this curved rod is a coiled spring 27 which has its opposed ends bearing against washers 28 fitted upon the rod so that the spring functions to hold the scraping blade in contact with the periphery of the wheel C, and at the same time allows the blade to yield under certain circumstances and conditions. While the shank is of tubular formation in cross section, it is to be understood that the long branch 10 of this shank can vary in size and configuration so that the attachment can be used in conjunction with other types of drills, wherein the frame is constructed of angle iron rather than of tubing.

While it is believed that from the foregoing description, the nature and advantages of the invention will be readily apparent, I desire to have it understood that I do not limit myself to what is herein shown and described and that such changes may be resorted to when desired as fall within the scope of what is claimed.

Having thus described the invention, I claim:

A wheel scraper of the character described comprising a shank having a right angularly disposed end portion, means whereby the shank is secured to the vehicle frame, a scraping blade mounted on the angular end portion of the shank for pivotal movement, a stationary arm projecting from said end portion of the shank and having an elongated slot in one end thereof, a curved rod projecting from one side of the blade and slidable through said slot, and a coiled spring encircling said rod and interposed between the stationary arm and said blade whereby the latter is held in contacting engagement with the periphery of the wheel to be scraped.

In testimony whereof I affix my signature.

WILLIAM SLAVICK.